United States Patent
Willi et al.

(10) Patent No.: US 9,410,867 B2
(45) Date of Patent: Aug. 9, 2016

(54) LASER SYSTEM FOR MEASURING INTERNAL CYLINDER PRESSURE

(71) Applicant: Caterpillar Inc., Peoria, IL (US)

(72) Inventors: Martin Leo Willi, Dunlap, IL (US); Marion Billingsley Grant, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 72 days.

(21) Appl. No.: 14/565,061

(22) Filed: Dec. 9, 2014

(65) Prior Publication Data

US 2016/0161368 A1    Jun. 9, 2016

(51) Int. Cl.
| | | |
|---|---|---|
| G01M 15/00 | (2006.01) | |
| G01M 15/08 | (2006.01) | |
| F02F 1/24 | (2006.01) | |
| F02F 7/00 | (2006.01) | |

(52) U.S. Cl.
CPC .............. *G01M 15/08* (2013.01); *F02F 1/24* (2013.01); *F02F 7/0021* (2013.01)

(58) Field of Classification Search
CPC .......... G01M 15/08; F02F 7/0021; F02F 1/24
USPC ........................................................ 123/657
See application file for complete search history.

(56) References Cited

U.S. PATENT DOCUMENTS

| | | | |
|---|---|---|---|
| 4,620,093 A | 10/1986 | Barkhoudarian et al. | |
| 5,351,547 A | 10/1994 | Grudzien et al. | |
| 5,400,648 A * | 3/1995 | Mahr ................... | G01M 15/08 73/114.16 |
| 5,452,087 A | 9/1995 | Taylor et al. | |
| 5,852,245 A | 12/1998 | Wesling et al. | |
| 6,188,952 B1 * | 2/2001 | Serra .................... | F02B 77/08 123/406.24 |
| 6,941,813 B2 | 9/2005 | Boukhny et al. | |
| 2011/0007153 A1 * | 1/2011 | Webster ............ | F15B 15/2876 348/135 |
| 2015/0136049 A1 * | 5/2015 | Stoppel ................. | F01P 3/16 123/41.32 |

* cited by examiner

*Primary Examiner* — Marguerite McMahon
(74) *Attorney, Agent, or Firm* — Finnegan, Henderson, Farabow, Garrett & Dunner, LLP

(57) ABSTRACT

A system is disclosed for measuring internal cylinder pressure of a combustion chamber at least partially formed by a cylinder head. The system may include an emitter configured to generate and emit a wavelength of energy along a surface of the cylinder head, and a target inline with the emitter and configured to receive the wavelength of energy. The system may also include a controller in communication with the emitter and/or target. The controller may be configured to correlate a distortion of the wavelength of energy to the internal pressure.

20 Claims, 2 Drawing Sheets

LASER SYSTEM FOR MEASURING INTERNAL CYLINDER PRESSURE

TECHNICAL FIELD

The present disclosure relates generally to a system for measuring pressure and, more particularly, to a laser system for measuring internal cylinder pressure.

BACKGROUND

An internal combustion engine includes an engine block defining a plurality of cylinders having bores, and pistons that reciprocate within the cylinder bores to generate mechanical power. A cylinder head sits on top of the cylinder bores to form combustion chambers, in which fuel and air are injected. Injectors of the internal combustion engines are designed to proportionately distribute mechanical power between the plurality of cylinders. However, the proper distribution of mechanical power may be disrupted by a number of issues, including faulty mechanical construction, inevitable wear of the mechanical components, and ineffective combustion controls. This imbalance can cause numerous undesirable effects including reduced engine performance, unbalanced torsional forces on the crankshaft, excessive stresses on engine components, and increased fuel consumption and emissions.

The conventional method of engine balancing involves taking direct pressure measurements at a bottom deck of the cylinder head. The pressure measurements are analyzed and compared to determine which cylinders are firing high or low, relative to the average pressure of the cylinders. This method has some drawbacks due to the fact that the conventional pressure sensor requires holes to be drilled through the cylinder head to expose the sensor to the pressurize inside the cylinder bore. The holes compromise the strength and the durability of the cylinder, and the location at the bottom deck experiences high temperatures thus potentially causing errant readings and necessitating bulky coolant components.

One attempt to improve the conventional method of sensing pressure in a combustion chamber is disclosed in U.S. Pat. No. 4,620,093 of Barkhoudarian et al. that published on Oct. 28, 1986 ("the '093 patent"). In particular, the '093 patent discloses a non-intrusive optical pressure sensor for measuring the pressure of a rocket engine. The pressure sensor is composed of a pressure deflectable diaphragm in communication with the subject container and which includes a diffraction grating on one of its surface, means for directing a laser to strike the optical grating, and a photo-position detector for generating pressure signals responsive to the changes in position of the diffraction grate.

Even though this method of sensing pressure may provide some improvement because it does not require exposure to the combustion chamber, it is still less than optimal. Generally, the pressure sensor of '093 is specifically designed for space flight, which experiences different conditions than the typical vehicular combustion chamber. The addition of a deflectable diaphragm to a vehicular cylinder would require substantial reconstruction, adding costs and inherently reducing strength of the cylinder. The pressure sensor of '093 also requires an undesirable wall thickness to accommodate the complex pathway of the laser.

The laser system of the present disclosure solves one or more of the problems set forth above and/or other problems in the art.

SUMMARY

In one aspect, the present disclosure is directed to a system for measuring internal pressure of a combustion chamber at least partially formed by a cylinder head. The system may include an emitter configured to generate and emit a wavelength of energy along a surface of the cylinder head, and a target lane with the laser emitter and configured to receive the wavelength of energy. The system may also include a controller in communication with the emitter and/or target, the controller configured to correlate a distortion of the wavelength of energy to the internal pressure.

In another aspect, the present disclosure is directed to a method of measuring internal cylinder pressure of an engine. The method may include emitting a wavelength of energy along a surface of a cylinder head, and receiving the wavelength of energy. The method may further include measuring a deflection of the wavelength of energy induced by deformation of the cylinder head, and correlating the deflection of the wavelength of energy to the pressure of the combustion chamber.

In yet another aspect, the present disclosure is directed to an engine. The engine may include an engine block. The engine block may have a cylinder bore and a cylinder head closing off the cylinder bore to form a combustion chamber. The cylinder head may have a top deck, a bottom deck, a first side surface, a second side surface, and a bore passing laterally through the cylinder head. The engine may further include an emitter configured to generate and emit a wavelength of energy through the bore, and a target inline with the emitter and configured to receive the wavelength of energy. One of the emitter and the target may generate a signal based on a distortion of the wavelength of energy. The engine may further include a controller configured to receive the signal and correlate the signal to a pressure of the combustion chamber.

DETAILED DESCRIPTION

Figure 1:
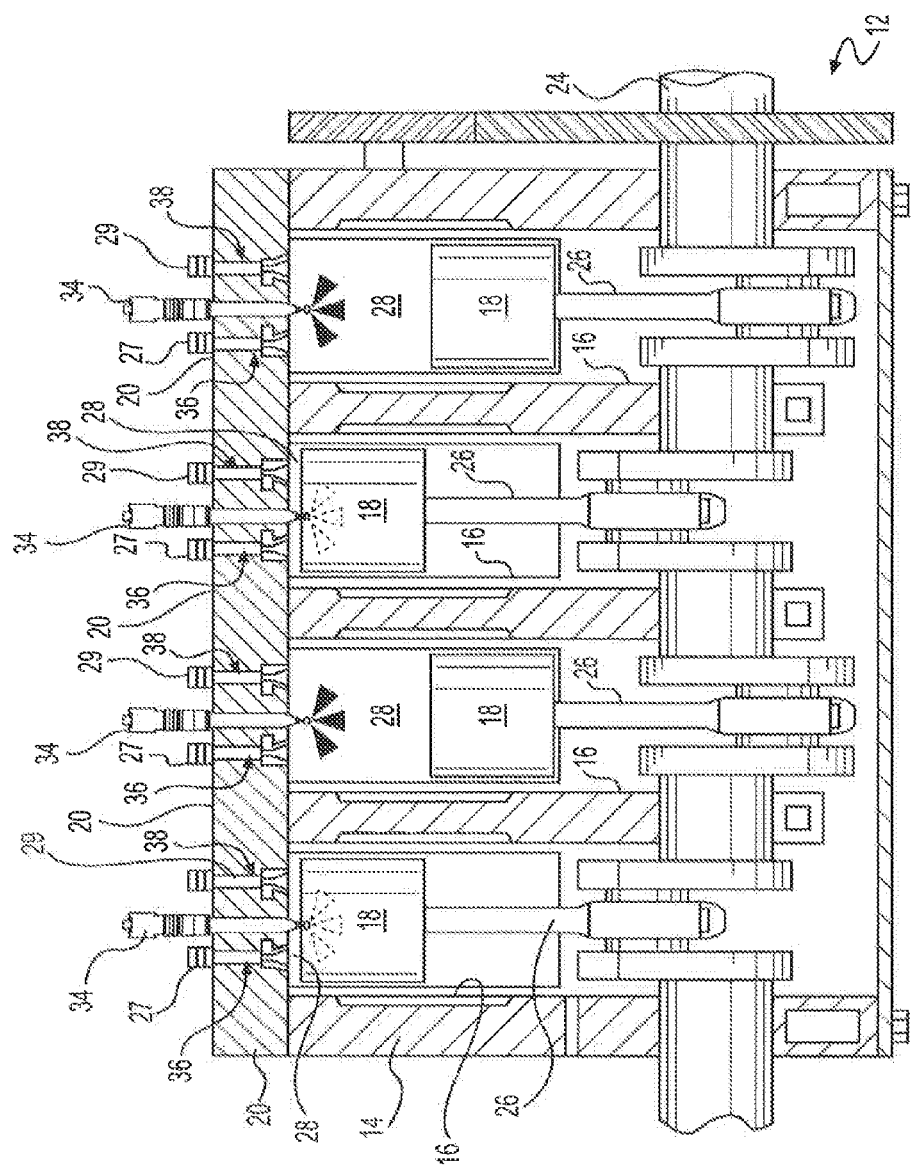
FIG. 1 is a cross-sectional illustration of an exemplary disclosed engine.

FIG. 1 illustrates an exemplary engine 12. For the purposes of this disclosure, engine 12 is depicted and described as a four-stroke diesel engine. One skilled in the art will recognize, however, that engine 12 may be any other type of combustion engine such as, for example, a two or four-stroke gasoline or gaseous fuel-powered engine.

Engine 12 may include an engine block 14 that at least partially defines a plurality of cylinders 16. A piston 18 may be slidably disposed within each cylinder 16 to reciprocate between a top-dead-center position and a bottom-dead-center position, and a cylinder head 20 may be associated with each cylinder 16. Each cylinder 16, piston 18, and cylinder head 20 may together at least partially define a cylinder assembly 22, which forms a combustion chamber 28. A fuel injector 34 may be at least partially disposed within each cylinder head 20 and configured to inject fuel into each respective combustion chamber 28 to support fuel combustion within engine 12. One or more intake valves 27 and exhaust valves 29 may also be at least partially disposed within intake bores 36 and exhaust bores 38 of cylinder head 20 and configured to selectively allow and block flows of air and exhaust into and out of combustion chamber 28. Engine 12 may also include a crankshaft 24 that is rotatably supported within engine block 14 by way of a plurality of journal bearings (not shown). A connecting rod 26 may connect each piston 18 to crankshaft 24 so that a sliding motion of piston 18 within each respective cylinder 16 results in a rotation of crankshaft 24.

Figure 2:
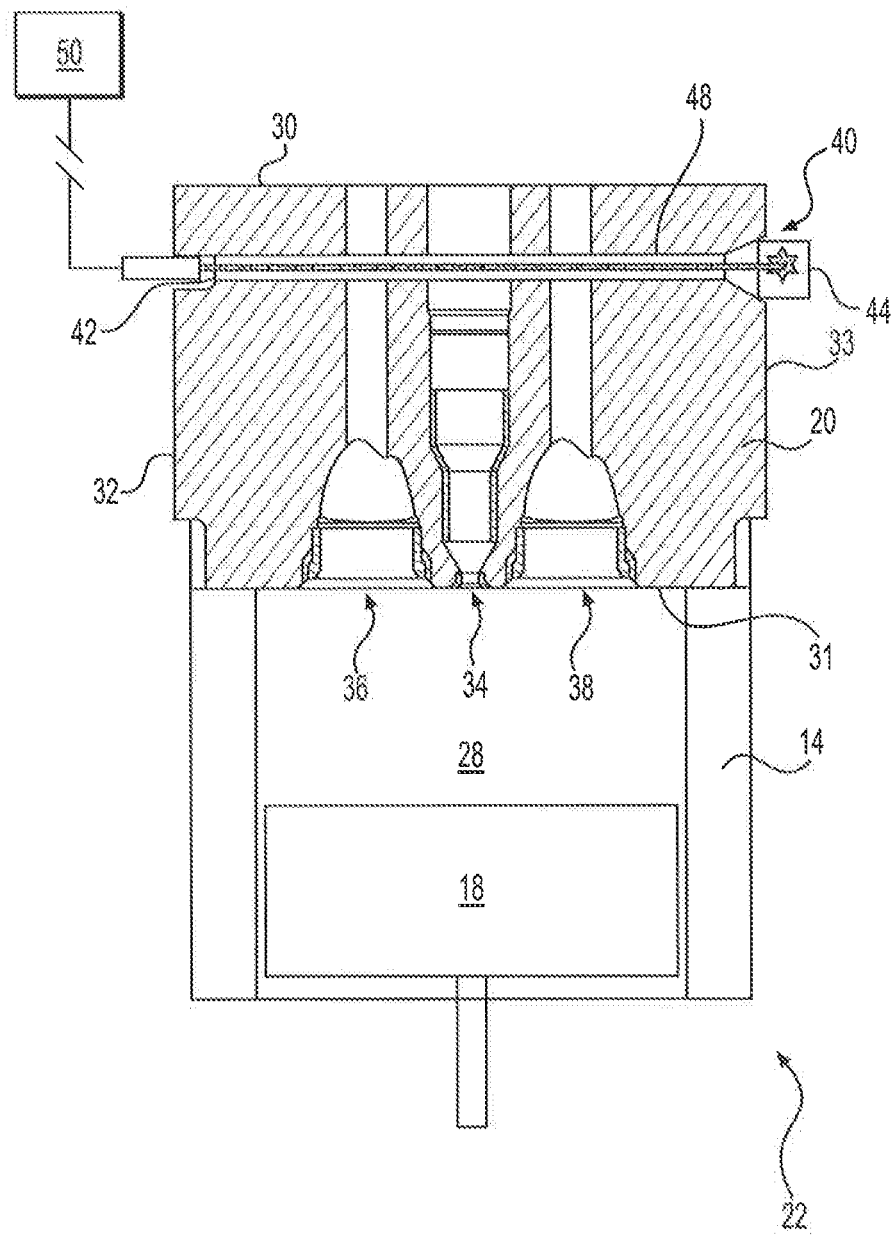
FIG. 2 is an enlarged cross-sectional illustration of an exemplary portion of the engine of FIG. 1.

As shown in FIG. 2, cylinder head 20 may have a top deck 30, a bottom deck 31, a first side surface 32, a second side surface 33, and a bore 48 passing through side surfaces 32, 33. A laser system 40 may be positioned at least partially within bore 48 to measure elastic deformation of cylinder head 20, at a location of relatively low temperature and stress. Bore 48 may extend through cylinder head 20 generally perpendicular to an axis of combustion chamber 28, at a lateral location that is not impeded by fuel injector 34, intake valve 27, and exhaust valve 29. Laser system 40 may include an emitter 42 and a target 44. Emitter 42 may generate and emit a wavelength of energy and direct it through a linear pathway of bore 48 toward target 44. In one embodiment, target 44 may receive the wavelength of energy and generate a signal. In another embodiment, target 44 may include a mirror, which reflects the wavelength of energy back toward emitter 42, which then receives the wavelength of energy and generates a signal. When cylinder head 20 is in a state of low deflection, target 44 may be generally inline with emitter 42, such that the emitted energy may be substantially equal to the received energy.

Laser system 40 may emit energy of any wavelength and frequency sufficient to determine the deformation of the walls of bore 48. Laser system 40 may include, for example, one or more of an Excimer laser, Yb:tunstates laser, a $CO_2$ laser, Nd:YAG laser, a DPSS laser, or any other type of laser known in the art.

Laser system 40 may be positioned in any number of locations. Emitter 42 and target 44 may be located on opposite sides of an area of cylinder head 20 known to have a relatively large deflection. In some embodiments, emitter 42 may be positioned at first side surface 32 of cylinder head 20, while target 44 may be positioned at second side surface 33. Emitter 42 and target 44 may be protected and completely enclosed within bore 48. In other embodiments, emitter 42 may extend outward from first side surface 32, and/or target 44 may extend outward from second side surface 33, in order to increase the length of the effective pathway of energy thus allowing for measurements of smaller deformations.

In FIG. 2, bore 48 is depicted proximate top deck 30 of cylinder head 20, but bore 48 may be positioned anywhere along a thickness of cylinder head 20 between top deck 30 and bottom deck 31. In some embodiments, bore 48 may be positioned in the top half of the distance between top deck 30 and bottom deck 31. In some embodiments, bore 48 may be positioned in the top third of the distance between top deck 30 and bottom deck 31. In an alternative embodiment, emitter 42 and target 44 may be positioned above top deck 30, such that bore 48 may be omitted (not shown). Bore 48 may contain a vacuum, in some embodiments, to reduce the loss of energy due to air resistance through the pathway. In one exemplary embodiment, bore 48 has a diameter of about 1-10 mm (e.g. about 5 mm).

Engine 12 may include any number of laser systems 40. For example, engine 12 may have a laser system 40 corresponding with each combustion chamber 28. In another embodiment, a plurality of laser systems 40 may correspond with each combustion chamber 28 to create a three dimensional mapping of the deformation of cylinder head 20. The plurality of laser systems 40 of each combustion chamber 28 may be arranged generally perpendicular or parallel to each other. Alternatively, laser system 40 may extend across multiple combustion chambers 28 to provide for longer distances traveled in order to measure smaller deformations.

Emitter 42 and/or target 44 of laser system 40 may be electrically connected to a controller 50. Controller 50 may embody a single microprocessor or multiple microprocessors that include a means for monitoring signal of laser system 40. For example, controller 50 may include a memory, a secondary storage device, a clock, and a processor, such as a central processing unit or any other means for accomplishing a task consistent with the present disclosure. Numerous commercially available microprocessors can be configured to perform the functions of controller 50. It should be appreciated that controller 50 could readily embody a general machine controller capable of controlling numerous other engine functions. Various other known circuits may be associated with controller 50, including signal-conditioning circuitry, communication circuitry, and other appropriate circuitry. Controller 50 may be further communicatively coupled with an external computer system, instead of or in addition to including a computer system, as desired.

Controller 50 may be configured to direct emitter 42 to generate and emit the wavelength of energy. Controller 50 may further be configured to continually receive a signal, from one of emitter 42 and target 44, indicative of the distortion of the wavelength of energy, and to determine any number of conditions of combustion chamber 28. Controller 50 may constantly monitor the internal pressure of combustion chamber 28. Controller 50 may be configured to signal a fault condition when peak pressure or average pressure reaches inefficient or undesired conditions.

Controller 50 may be connected to fuel injector 34, intake valve 27, and/or exhaust valve 29 to adjust the degree of combustion in combustion chamber 28. For instance, in situations where the peak pressure is above a desired level, controller 50 may signal to fuel injector 34 to inject less fuel into combustion chamber. In situations where the timing of one piston 18 is not coordinated with other pistons 18, controller 50 may adjust the timing of fuel injector 34, intake valve 27, and exhaust valve 29 in order to increase the efficiency of engine 12. Other control processes known in the art may also be implemented by controller 50, based on the pressure signal generated from laser system 40.

INDUSTRIAL APPLICABILITY

The disclosed system may be used in any application where it is desired to sense the pressure in an enclosed chamber. The disclosed system provides an advantage of accurately measuring pressure without intruding in the combustion chamber. In one disclosed embodiment, laser system 40 is placed in cylinder head 20 at a location of relatively low temperature and stress. This reduces the chances of faulty readings without the requirement of bulky coolant components. The positioning of bore 48 through cylinder head 20 would also not substantially impact the structural properties of cylinder assembly 22.

As shown in FIG. 2, cylinder head 20 may sit atop engine block 14 to enclose combustion chamber 20. Engine block 14 may be made of cast iron, and cylinder head 20 may be made of aluminum. The aluminum of cylinder head 20 may allow for rapid extraction of the combustion heat, thus cylinder head 20 maintains relatively low temperatures. Combustion within combustion chamber 28 further creates cyclical loads on cylinder head 20 which induces small elastic deformation. The elastic and cyclical nature of the deformation of cylinder head 20 may be correlated with the pressure inside combustion chamber 28.

Emitter 42 may generate and direct a wavelength of energy through bore 48 of cylinder head 20 toward target 44. The pressure of combustion chamber 28 may elastically deform the walls of bore 48 into the pathway of the wavelength of energy, and emitter 42 and target 44 may pivot out of line with each other. The wavelength of energy may contact the deformed walls, distorting its wavelength and frequency. With a sufficient degree of deformation, the pathway of the energy may even be completely broken, such that the energy bounces off the wall of bore 48 directly back to emitter 42. The distortion of the wavelength and amplitude, and the range of time between generation and reception of the energy, may be obtained by one of emitter 42 and target 44. Emitter 42 or target 44 may then create a signal indicating the distortion, which is relayed to controller 50. Controller 50 may utilize the signal to determine the deformation of cylinder head 20, and then correlate the signal with the internal pressure of combustion chamber 38 according to the modulus of elasticity of cylinder head 20.

It will be apparent to those skilled in the art that various modifications and variations can be made to the disclosed laser system for measuring internal pressure. Other embodiments will be apparent to those skilled in the art from consideration of the specification and practice of the disclosed laser system for measuring internal pressure. It is intended that the specification and examples be considered as exemplary only, with a true scope being indicated by the following claims and their equivalents.

What is claimed is:

1. A system for measuring internal pressure of a combustion chamber at least partially formed by a cylinder head, the system comprising:
   an emitter configured to generate and emit a wavelength of energy along a surface of the cylinder head;
   a target inline with the emitter and configured to receive the wavelength of energy; and
   a controller in communication with the emitter and/or target, the controller configured to correlate a distortion of the wavelength of energy to the internal pressure.

2. The system of measuring internal pressure of claim 1, wherein the target includes a mirror configured to reflect the wavelength of energy, and the emitter is configured to receive the wavelength of energy and generate a signal based on the distortion of the wavelength of energy.

3. The system of measuring internal pressure of claim 1, wherein the target is configured to generate a signal based on the distortion of the wavelength of energy.

4. The system of measuring internal pressure of claim 1, wherein the emitter and the target are configured to be positioned on opposite side surfaces of the cylinder head.

5. The system of measuring internal pressure of claim 1, wherein the emitter and the target are sized to be positioned in a bore of about 1-10 mm.

6. A method of measuring internal pressure of a combustion chamber, comprising:
   emitting a wavelength of energy along a surface of a cylinder head;
   receiving the wavelength of energy;
   measuring a distortion of the wavelength of energy induced by a deformation of the cylinder head; and
   correlating the deflection of the wavelength of energy to an internal pressure of the combustion chamber.

7. The method of claim 6, wherein the emitting a wavelength of energy along a surface is performed along a top deck of the cylinder head.

8. The method of claim 6, wherein the emitting a wavelength of energy along a surface is performed along a surface of a bore passing laterally through the cylinder head.

9. The method of claim 6, further including reflecting the wavelength of energy back to the emitter.

10. An engine comprising:
    an engine block defining:
      a cylinder bore;
      a cylinder head closing off the cylinder bore to form a combustion chamber, the cylinder head having a top deck, a bottom deck, a first side surface, and a second side surface;
    and a bore passing laterally through the cylinder head; an emitter configured to generate a wavelength of energy through the bore;
    a target inline with the emitter and configured to receive the wavelength of energy, wherein one of the emitter and the target generates a signal based on a distortion of the wavelength of energy; and
    a controller configured to receive the signal and correlate the signal to a pressure of the combustion chamber.

11. The engine of claim 10, wherein the target includes a mirror to reflect the wavelength of energy, and the emitter is configured to generate the signal.

12. The engine of claim 10, wherein the target is configured to generate the signal.

13. The engine of claim 10, wherein the bore has a diameter of about 1-10 mm.

14. The engine of claim 10, wherein the emitter and the target are positioned on opposite side surfaces of the cylinder head.

15. The engine of claim 10, wherein the emitter is positioned in a first side surface and the target is positioned in the second side surface.

16. The engine of claim 15, wherein the emitter extends outward from the first side surface, and the target extends outward from the second side surface.

17. The engine of claim 10, wherein the bore is external of the cylinder bore, and generally perpendicular to an axis of the cylinder.

18. The engine of claim 10, wherein the emitter and the target are completely enclosed in the bore.

19. The engine of claim 10, wherein the bore is positioned in the top half of a distance between the top deck and the bottom deck.

20. The engine of claim 19, wherein the bore is positioned in the top third of a distance between the top deck and the bottom deck.

* * * * *